Dec. 24, 1957 M. C. THOMPSON, JR 2,817,759

CRYSTAL-STABILIZED PULSE-PAIR GENERATOR

Filed April 21, 1955 2 Sheets-Sheet 1

INVENTOR

Moody C. Thompson, Jr.

BY Arthur Vinograd

Leonard F. Stoll ATTORNEY

AGENT

CRYSTAL-STABILIZED PULSE-PAIR GENERATOR

Filed April 21, 1955 2 Sheets-Sheet 2

INVENTOR

Moody C. Thompson, Jr.

BY Arthur Vinograd ATTORNEY

Leonard F. Stoll AGENT 2,817,759

CRYSTAL-STABILIZED PULSE-PAIR GENERATOR

Moody C. Thompson, Jr., Boulder, Colo., assignor to the United States of America as represented by the Secretary of Commerce Application April 21, 1955, Serial No. 503,040
9 Claims. (Cl. 250—27)

The present invention relates to pulse-pair generators and more particularly to a pulse-pair generator in which both the pulse period and the phase shift are stabilized by a quartz crystal.

A number of pulse-pair generators for use in various television and radar circuits as well as for use in testing electronic counting circuits have been described in the prior art. However, all of the previous pulse-pair generators have had the serious drawback in that they lacked the desired stability required in many present day applications.

The pulse-pair generator of the present invention provides improved stability by means of a flip-flop circuit rendered conducting and subsequently nonconducting by the output from a crystal-controlled oscillator. As a result both the pulse period and the phase shift of the present generator output have the stability of a crystal-controlled oscillator.

One object of this invention is to provide an improved pulse-pair generator.

Another object of this invention is to provide a pulse-pair generator the output of which may be varied both as to period and to phase shift.

A further object of this invention is to provide a pulse-pair generator in which both the variable period and the variable phase shift of the output pulses are stabilized by a quartz crystal oscillator.

A final object of this invention is to provide a pulse-pair generator in which the conducting period of a bistable flip-flop circuit is determined by signals from a crystal-controlled oscillator.

Figure 1:
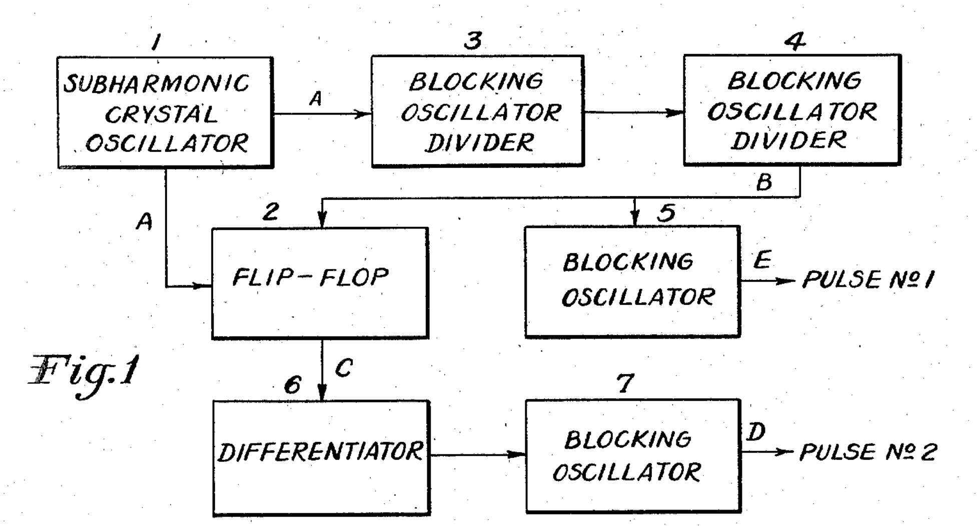
Figure 2:
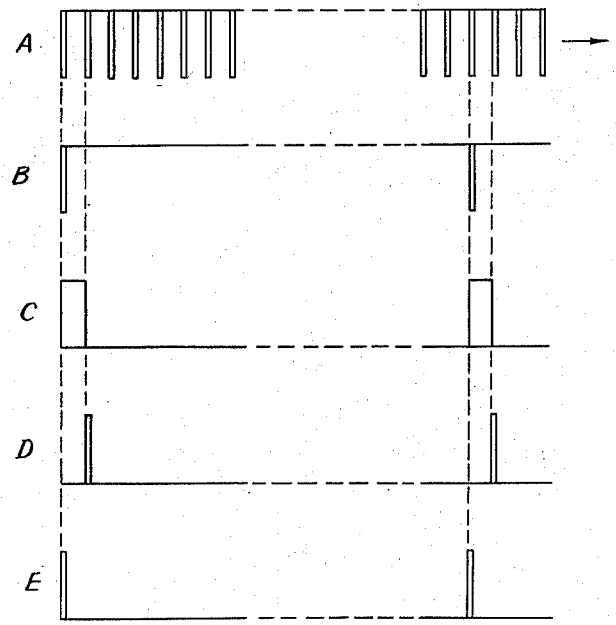
Figure 3:
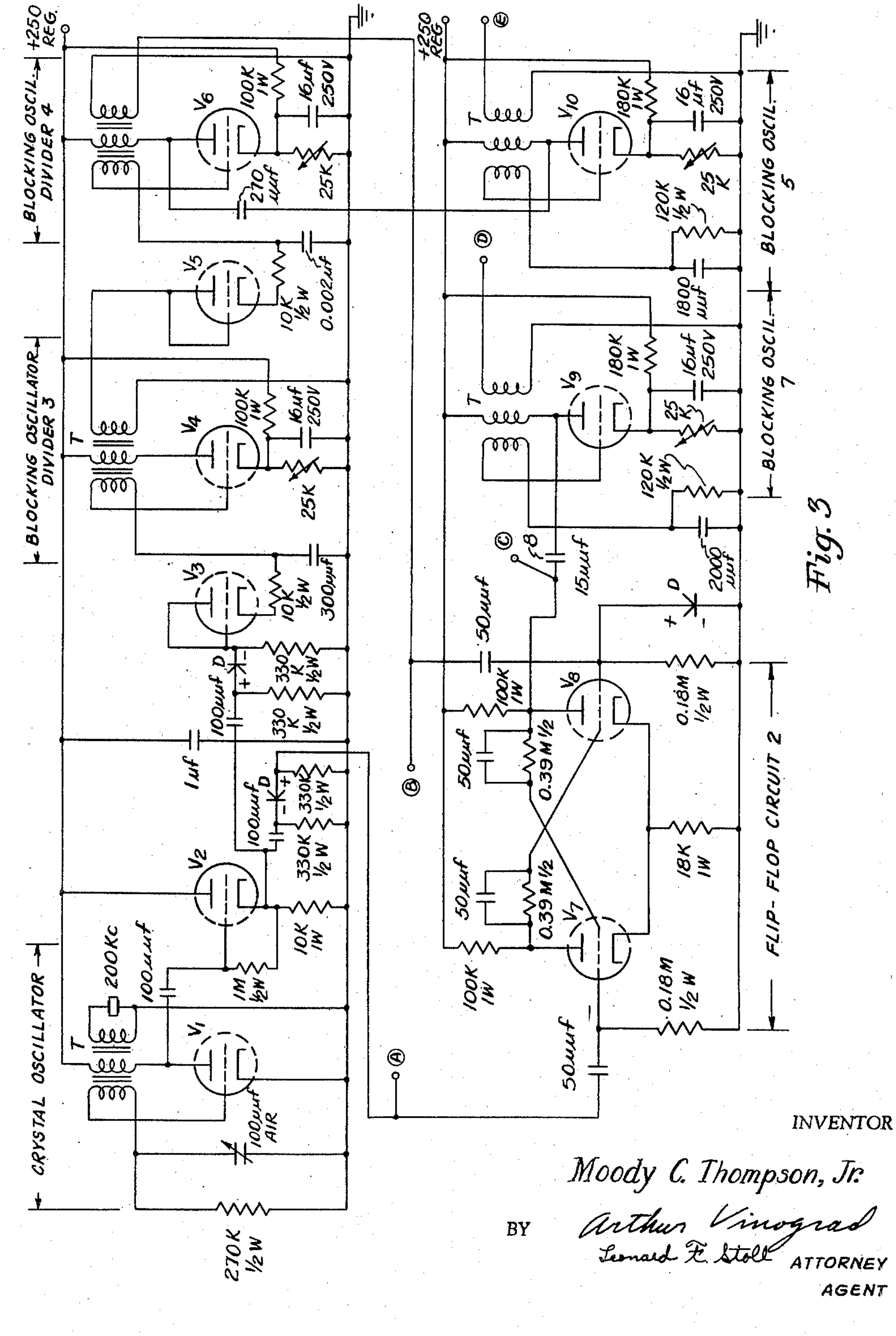

Other uses and advantages of the invention will become apparent upon reference to the specification and drawings in which:

Fig. 1 shows a block diagram of an embodiment of the pulse-pair generator of the present invention, Fig. 2 illustrates voltage waveforms generated at various points in the block diagram of Fig. 1, and Fig. 3 is a circuit diagram of the pulse-pair generator of the present invention.

Referring to Fig. 1 a subharmonic crystal oscillator 1 of the type disclosed in applicant's copending application Serial No. 376,770, filed August 26, 1953, now Patent No. 2,761,971, and fully shown in Fig. 3 supplies a pulse train of signals to a bistable flip-flop circuit 2. Signals are also fed from oscillator 1 to flip-flop circuit 2 by a separate path including auxiliary blocking oscillator dividers 3 and 4. The output of divider 4 is applied as an input to flip-flop circuit 2 and blocking oscillator 5. The output signal pulse of oscillator 5 comprises the first pulse of the pulse-pair output of the present invention. The output of flip-flop circuit 2 is fed to differentiator 6, which differentiates the trailing edge of the pulse from flip-flop circuit 2 and the output of which in turn is fed to blocking oscillator 7. The second pulse of the pulse-pair generator appears at the output of blocking oscillator 7.

A better understanding of the operation of the pulse-pair generator will be had by considering the pulse waveforms of Fig. 2. The letters identifying each waveform correspond respectively to the correspondingly lettered points in Fig. 1 at which the waveforms appear.

Crystal-controlled blocking oscillator 1 divides the fundamental frequency of a quartz crystal to produce a pulse train as shown in Fig. 2 at A, the period of which is equal to the desired spacing for the final pulse-pair. By the proper choice of oscillator components this period may have one of a wide range of fixed values.

This pulse train is fed to auxiliary dividers 3 and 4 and to one side of bistable flip-flop circuit 2. The auxiliary dividers are comprised of two stages of conventional blocking oscillator divider circuits capable of operating satisfactorily up to a division ratio of about fifteen per stage. The output of divider 4 is illustrated by waveform B in Fig. 2 and is applied to flip-flop circuit 2 and to blocking oscillator 5. This latter pulse is inverted and shaped for application to external circuits by blocking oscillator 5, the output of which represents the first pulse of the pulse-pair and is shown at E in Fig. 2. The pulse B fed to flip-flop circuit 2 renders it conducting in its minor state. The next succeeding pulse A from subharmonic crystal oscillator 1 serves to return the flip-flop circuit 2 to its major state of operation. A better understanding of the relationship of the pulse A from oscillator 1 and pulse B from divider 4 with the minor state conduction period of flip-flop circuit 2 can be had by comparing the pulses A and B with the flip-flop output shown at C in Fig. 2. The width of each pulse comprising waveform C in Fig. 2 is determined by pulse B which initiates the minor state conduction period of flip-flop 2 and by pulse A which terminates the minor state conduction period. As can be seen the relationship between pulses A and B, i. e., the repetition rate of subharmonic crystal oscillator 1 therefore determines the width of pulse C.

Pulse B is inverted and shaped in oscillator 5 and appears as pulse No. 1 of the pulse-pair as shown at E, Fig. 2. Since the trailing edge of pulse C is differentiated in differentiator 6 and shaped in oscillator 7 to form pulse No. 2 of the pulse-pair as shown at D, Fig. 2, it is obvious that the spacing or phase shift of the pulse-pair depends directly on the width of pulse C which, as explained above, depends on the repetition rate of oscillator 1. The phase shift of the pulse-pair therefore varies with the period or repetition rate of crystal oscillator 1. The percentage change in frequency of oscillator 1 determines the percentage change in the pulse-pair spacing. Since such spacing or phase shift depends directly upon the repetition rate of crystal oscillator 1 the phase shift necessarily will possess the stability of that oscillator which of course is governed by the stability of its crystal.

The pulse repetition rate of subharmonic crystal oscillator 1 in conjunction with dividers 3 and 4 also determines the period of the pulse-pair. As can be seen from pulses A and B of Fig. 2, the repetition rate or period of the first pulse and consequently of the pulse-pair is some submultiple of the period of oscillator 1. The particular submultiple chosen may be varied by varying the division factor of either divider 3 or divider 4 or both. However, the stability of pulse B and consequently output pulse E as to repetition rate remains that of crystal oscillator 1 since its period is some submultiple of the crystal-controlled oscillator 1. Therefore it can be seen that the period as well as the phase shift of the output pulse-pair as explained above both have the stability of crystal oscillator 1.

Fig. 3 shows the overall circuit diagram of the pulse-pair generator of the present invention. Tube V–1 and its associated circuitry comprises the subharmonic crystal oscillator 1 which is coupled through a cathode follower V–2 to the grid of the flip-flop circuit comprising tubes V–7 and V–8. Oscillator tube V–1 is also coupled to the blocking oscillator divider 3 comprising tube V–4 through cathode follower tubes V–2 and V–3. Divider tube V–4 is in turn coupled to blocking oscillator divider 4 comprising tube V–6 through another cathode follower tube V–5. The output at the plate of tube V–6 is fed to the plate of tube V–10 comprising blocking oscillator 6 while the output of the secondary of the transformer in the plate circuit of tube V–6 is fed to the grid of flip-flop tube V–8. The output obtained from the plate of flip-flop tube V–8 is applied to a differentiating circuit comprising capacitor 8 in series with tube V–9. This tube along with its associated circuitry comprises the blocking oscillator 7 from which the second pulse of the pulse-pair is derived at terminal D. The first pulse of the pulse-pair appears in the output of tube V–10 at terminal E. The polarity of either or both output pulses D and E may be reversed by reversing the connections of the respective transformer windings. All of the tubes shown are twin triodes of the 12AU7 type while the transformers in the blocking oscillator circuits are of the type identified as Utah 9262. The diode rectifiers shown may be of the 1N34A type. Since a complete circuit of an operative embodiment of the invention has been detailed in Fig. 3, the remaining circuit components are not further described.

In the model constructed in accordance with the present invention, repetition rates down to about 60 C. P. S. were desired with a pulse separation of approximately 125 microseconds. A crystal frequency of 200 kc./s. was used with the subharmonic oscillator dividing by 25 to produce a separation of 125 microseconds. By dividing in the blocking oscillator dividers 3 and 4 by factors of 11 and 12 respectively a repetition rate of 60.6 C. P. S. was obtained for the pulse-pairs. By using the consecutive division ratios in the subharmonic oscillator, the separation between the output pulses, that is, the pulse-pair phase shift, could be varied in steps of 5 microseconds. The stability of the repetition rate was found to be essentially that of a crystal oscillator (a few parts per million), and the stability of the pulse separation or phase shift was somewhat better than 6 parts in 10,000.

It will be apparent that the embodiment shown is only exemplary and that various modifications can be made in construction and arrangement within the scope of invention as defined in the appended claims.

What is claimed is:

1. A pulse-pair generator comprising subharmonic crystal oscillator means, means for dividing the output of said oscillator means, a bistable multivibrator, the output of said dividing means rendering said multivibrator conductive in its minor state, the output of said oscillator means rendering said multivibrator conductive in its major state, means for deriving an output from said multivibrator representative of its minor conductive state, means for differentiating said multivibrator output, and means for utilizing the output of said dividing means and said differentiated output as the first and second pulses respectively of said pulse-pair generator.

2. A pulse-pair generator comprising a subharmonic crystal oscillator means, means for dividing a first output of said oscillator means, a bistable multivibrator, the output of said dividing means rendering said multivibrator conductive in its minor state, a second output of said oscillator means rendering said multivibrator conductive in its major state, means for deriving an output from said multivibrator representative of its minor conductive state, means for differentiating said multivibrator output, and means for utilizing the output of said dividing means and said differentiated output as the first and second pulses respectively of said pulse-pair generator.

3. A pulse-pair generator comprising a subharmonic crystal oscillator means for generating a series of pulses, means for dividing the output of said oscillator means, a bistable multivibrator, the output of said dividing means serving to render said multivibrator conductive in its minor state, the output of said oscillator means serving to return said multivibrator to its major conductive state, means for deriving an output from said multivibrator representative of its minor state conduction period, means for differentiating said multivibrator output, and means for utilizing the output of said dividing means and said differentiated output as the first and second pulses respectively of said pulse-pair generator.

4. A pulse-pair generator comprising a subharmonic crystal oscillator means for generating a pulse train, means for dividing said pulse train, a bistable multivibrator, the pulses from said divided pulse train serving to render said multivibrator conductive in its minor state, the pulses from said undivided pulse train serving to render said multivibrator conductive in its major state, means for deriving an output from said multivibrator representative of its minor state conduction period, means for differentiating said multivibrator output, and means for utilizing the output of said dividing means and said differentiated output as the first and second pulses respectively of said pulse-pair generator.

5. A pulse-pair generator as defined in claim 4 in which said multivibrator output is in the form of a series of pulses and said differentiating means comprises means for differentiating the trailing edges of the pulses of said multivibrator output.

6. A pulse-pair generator comprising a crystal-controlled subharmonic oscillator producing a pulse train, divider means for dividing said pulse train into a series of similar pulses having a longer pulse period than said pulse train, a bistable multivibrator, said series of pulses serving to render said multivibrator conductive in its minor state, pulses from said pulse train serving to render said multivibrator conductive in its major state, means for deriving an output from said multivibrator representative of its minor state conduction period, means for differentiating said multivibrator output, and means for utilizing said series of pulses and said differentiated output as the first and second pulses respectively of said pulse-pair generator.

7. A pulse-pair generator as defined in claim 6 in which said multivibrator output is in the form of a series of pulses and said differentiating means comprises means for differentiating the trailing edges of the pulses of said multivibrator output.

8. A pulse-pair generator comprising a crystal-controlled subharmonic oscillator producing a first crystal stabilized pulse train, divider means for dividing said first pulse train into a second pulse train having a longer pulse period than said first pulse train, a bistable multivibrator, pulses from said second pulse train serving to render said multivibrator conductive in its minor state, pulses from said first pulse train serving to render said multivibrator conductive in its major state, means for deriving an output from said multivibrator representative of its minor state conduction period, means for differentiating said multivibrator output, and means for utilizing the pulses of said second pulse train and said differentiated output as the first and second pulses respectively of said pulse-pair generator.

9. A pulse-pair generator as defined in claim 8 in which said multivibrator output is in the form of a series of pulses and said differentiating means comprises means for differentiating the trailing edges of the pulses of said multivibrator output.

References Cited in the file of this patent

UNITED STATES PATENTS

| | | |
|---|---|---|
| 2,537,077 | McVay et al. | Jan. 9, 1951 |
| 2,591,816 | Holland et al. | Apr. 8, 1952 |
| 2,705,285 | Holland et al. | Mar. 29, 1955 |